Sept. 29, 1953 G. CORREA 2,653,511
STEREOSCOPIC PROJECTION APPARATUS
Filed May 9, 1950 2 Sheets-Sheet 1
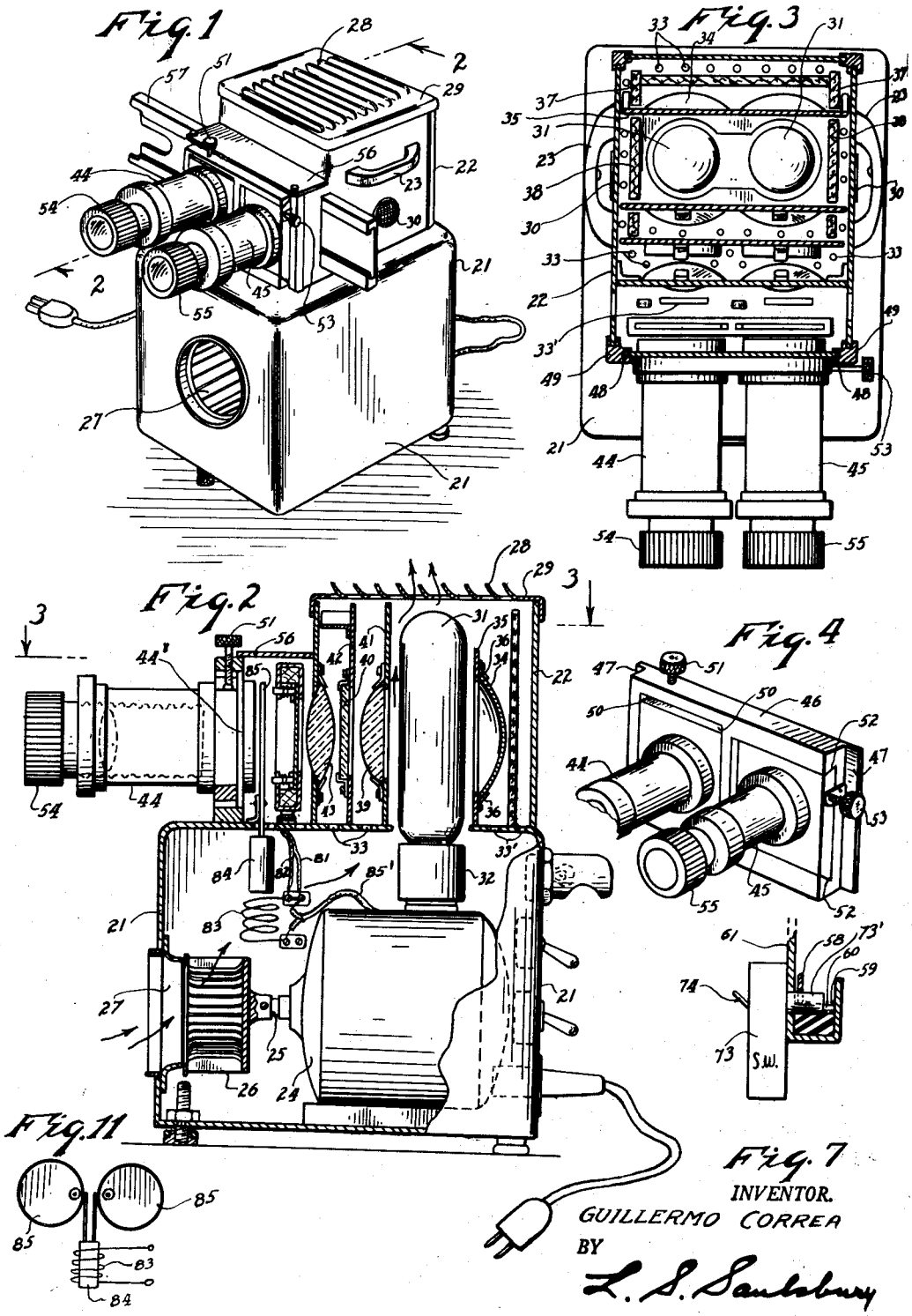
INVENTOR.
GUILLERMO CORREA
BY
L. S. Saulsbury
ATTORNEY Sept. 29, 1953          G. CORREA          2,653,511
STEREOSCOPIC PROJECTION APPARATUS
Filed May 9, 1950          2 Sheets-Sheet 2
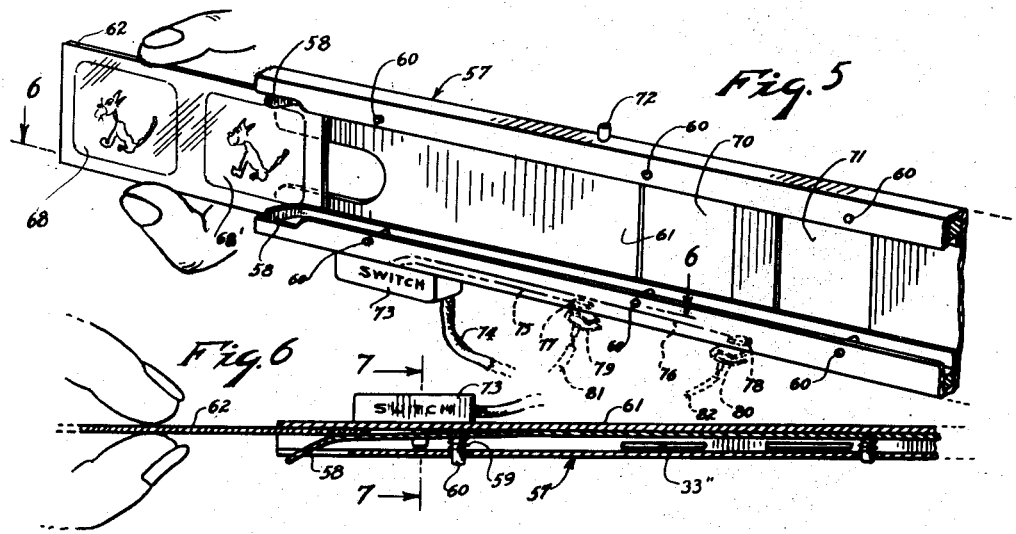
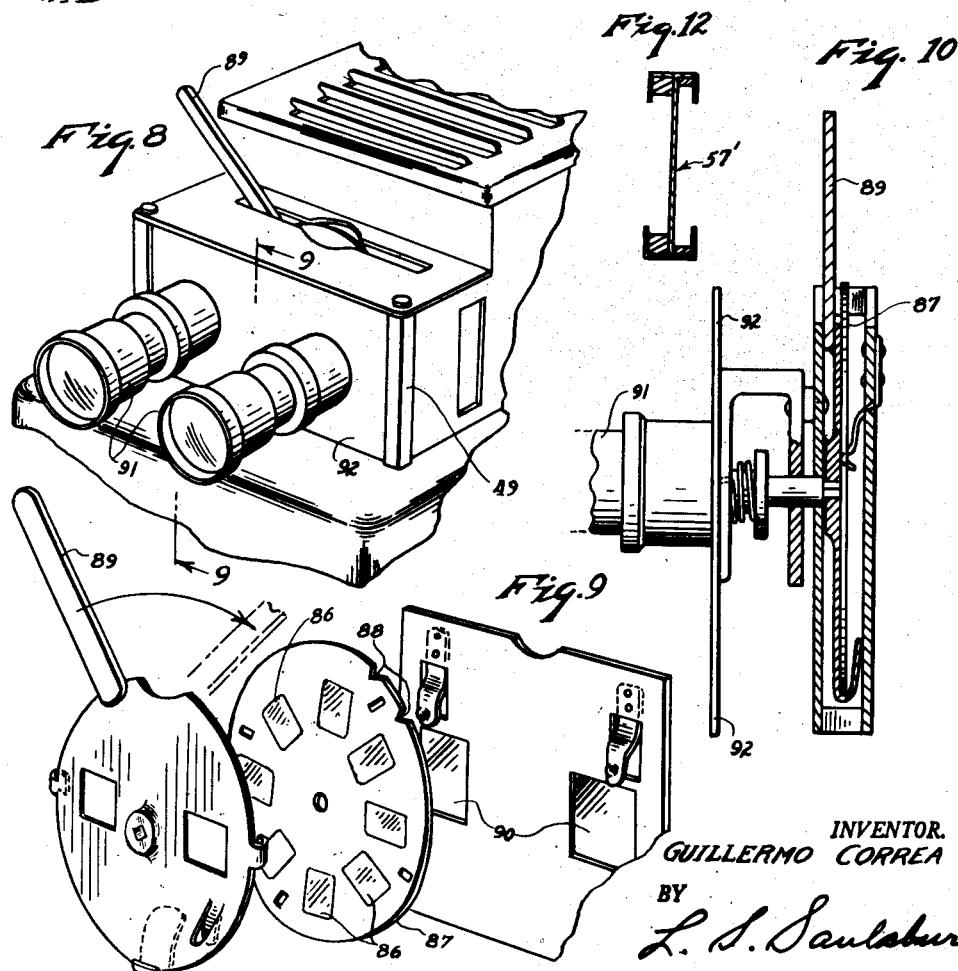
INVENTOR.
GUILLERMO CORREA
BY
L. S. Saulsbury
ATTORNEY Patented Sept. 29, 1953

2,653,511

UNITED STATES PATENT OFFICE 2,653,511

STEREOSCOPIC PROJECTION APPARATUS

Guillermo Correa, New York, N. Y.

Application May 9, 1950, Serial No. 160,927

1 Claim. (Cl. 88—26)

The present invention relates to picture projectors and more particularly to projectors for use with stereoscopic images.

The pair of stereoscopic images, when projected on a metallic surface viewing screen, are polarized along mutually perpendicular axes when the projector is equipped with polarizing filters. An observer wearing correspondingly polarized spectacles will view each image separately with the corresponding eye thereby deriving the stereoscopic three-dimensional effect.

An object of the invention is to provide a stereoscopic projector adaptable for the projection of stereoscopic transparencies in a variety of commercial forms, such as slides, discs, reels and so forth, and wherein the projector is equipped to have optical elements such as projection lenses, condensers, polarizing filters and so forth, easily changed for the particular size and shape of the stereo pair.

Another object of the invention is the provision of a stereoscopic projector in which the projection lens assemblies are individually adjustable for alignment of both the horizontal and vertical axes in order to keep a suitable interocular separation on the screen of projected images so that the observer is able to see the stereo projection with a minimum of ocular discomfort.

A further object of the invention is to provide a projector in which the light source will be interrupted during the course of changing the transparencies to be projected so as to avoid the disagreeable sight of seeing the next stereo pair pass through the screen.

Still another object of the invention is to provide a device of this character in which the various lenses, condensers and filters of the optical system are readily removable for cleaning. Since these lenses are subjected to heat from the projection lamp and are exposed to dust-laden air forced through the housing of the optical system, this feature of the invention is particularly desirable from the standpoint of keeping all optical surfaces in a clean condition.

Other and further objects will become apparent upon reading the following specification together with the accompanying drawing forming a part thereof.

In the drawing:

Fig. 1 is a perspective view of a projector embodying the invention.

Fig. 2 is a sectional view in elevation taken along the line 2—2 of Fig. 1.

Fig. 3 is a sectional plan view taken along the line 3—3 of Fig. 2.

Fig. 4 is an enlarged perspective view of a removable projection lens holder.

Fig. 5 is an enlarged fragmentary perspective view of a projection slide holder.

Fig. 6 is a sectional plan view taken along the line 6—6 of Fig. 5.

Fig. 7 is a fragmentary sectional view in elevation taken along the line 7—7 of Fig. 6.

Fig. 8 is a fragmentary perspective view showing a modified form of holder for transparencies arranged on a rotatable disc.

Fig. 9 is a fragmentary exploded perspective view.

Fig. 10 is a view in sectional elevation taken along the line 9—9 of Fig. 8.

Fig. 11 is a diagrammatic representation of an electrically actuable double shutter.

Fig. 12 is a sectional view in elevation of a slide similar to the slide of Fig. 5, but of modified form.

Referring to Fig. 1, the projector comprises a lower housing member 21 and an upper housing member 22 provided with lifting handles 23. Disposed within the lower housing member 21 is an electric motor 24 having an extending shaft 25 which drives a sirocco type blower rotor 26. When the motor 24 is in operation, air under pressure is drawn into the lower housing member 21 and forced out through louvers 28 in a cover 29 of upper housing member 22 for the purpose of removing the heat generated by the lamps from the optical elements and keeping the projector stereo pair in a cool condition, thus protecting the transparencies from being damaged by the lamp heat concentrated upon them by the condensers. Additional air may enter upper housing member 22 through mesh covered apertures 30.

Disposed within upper housing member 22 is a pair of projection lamps 31 mounted in sockets 32 of usual construction.

The top of lower housing member 21 which forms the bottom of upper housing member 22 is provided with a plurality of apertures 33 which permit the upward flow of air to louvers 28 in cover 29. Apertures 33' admit cool air from the lower housing 21 and direct it to openings 33", Fig. 6, in slide carrier 57 or to changer for disc stereo pair, Fig. 10, to cool the same.

A pair of reflectors 34 are secured to a plate 35 by fastening devices 36, Fig. 2, the horizontal spacing between the two reflectors 35 corresponding to the spacing between the two high intensity projection lamps 31. Plate 35 is loosely held at its outer edges between vertical guide members 37 and 38, its bottom edge resting on the upper surface of lower housing member 21. With cover 29 removed from upper housing member 22, plate 35 may be readily lifted out for cleaning or polishing reflectors 34. After cleaning, plate 35 may be readily replaced.

Similarly, a pair of condensing lenses 39 and a pair of heat filters 40 are likewise secured to removable plates 44 and 42 respectively, thus facilitating the removal and replacement of these lenses and filters for cleaning or other purposes. With plates 41 and 42 removed, convenient access may be had to the inner surfaces of double convex condensing lenses 43.

Air enters the apertures 33 and 33' between the removable plates 35, 41 and 42 and circulates over the external surfaces of the several lenses and filters thereby providing a cooling effect to offset the heating action of the high light intensity lamps 31.

As may be best seen in Fig. 4, a pair of optical projection units 44 and 45 are shown mounted in a supporting member 46 having lateral flanges 47. Flanges 47 are adapted for sliding engagement with grooves 48 in vertical corner posts 49 of the upper housing member 22.

Projection unit 44 is shown slidably mounted in vertical grooves 50, its position being adjustable by knurled screw 51. Correspondingly, projection unit 45 is horizontally adjustable, being slidably mounted in grooves 52, its position being adjustable by means of knurled screw 53. Projection units 44 and 45 may be individually focused by rotation of knurled lens holding members 54 and 55, respectively. With cover plate 56 removed, supporting member 46 may be raised clear of vertical corner posts 49. Each of the projection units includes a polarizing filter 44', the polarizing axis of which is set at 90° to each other, but 45° from the vertical axis of the projection unit. This permits replacement of projection unit assembly 46 by a different projection unit assembly suitable for projecting any desired stereo pair be it in the form, shape or size of slide, disc or reel.

A horizontally movable projection slide or transparency carrier 57 is shown provided with guide members 58 which are held in position by a plurality of pins 60 along which guide members 58 engage with a free fit. Each of the pins 60 is provided with a compression spring 59, these springs serving to hold guide members 58 in yielding engagement with back portion 61 of slide carrier 57.

As shown in Fig. 5, a projection slide 62 may be inserted in slide carrier 57 to engage upper and lower guide members 58 and moved longitudinally therethrough until the stereo pair 68—68' is in alignment with respective apertures 70—71 in carrier 57. When this condition has been attained, the stereo pair is in operative alignment with optical projection units 44 and 45 for projection. Pin 72 is for the purpose of aligning the centers of openings 70 and 71 with the centers of the optical systems of the projector.

A switch member 73, of known type, which is responsive to an extremely small mechanical movement, is disposed on the under side of slide holder 57, arranged to interrupt the circuit of one conductor of a flexible cord 74. The circuit is closed only when a projection slide such as 62 is inserted in slide carrier 57. The circuit extends through conductors 75 and 76 to contact members 77 and 78 respectively.

Contact members 77 and 78 are positioned to engage stationary contact members 79 and 80 when slide carrier 57 is inserted in the correct position for projection. This causes energization of wires 81 and 82 provided a projection slide is in the slide carrier 57 to actuate switch 73. With no slide in slide carrier 57 or slide 62 moved to a point past switch 73, the circuit will remain open at switch 73. The slide 62 is then free of the switch button 73'. Button 73' has an extension 74 for the purpose of actuating the switch manually.

Energization of conductors 81 and 82 energizes solenoid winding 83 drawing plunger 84 downwardly. Plunger 84 is connected to a pair of movable shutters 85. Shutters 85 normally cut off light from lamps 31 being arranged to move aside to permit the passage of light upon energization of winding 83.

Energization of conductors 81 and 82 also energizes a two conductor flexible cord 85' which extends to lamp sockets 32 for lighting lamps 31.

Fig. 12 shows a slide holder 57' similar to Fig. 5 but adapted to receive transparencies of different widths on opposite sides thereof.

Fig. 8 shows an arrangement for projecting transparencies 83 mounted on a disc-shaped supporting member 87. Disc 87 is provided with notches 88 which cooperate with lever 89. Each time lever 89 is moved a different pair of transparencies 86 is brought into operative alignment with polarizing filters 90. Projection lens assemblies 91 are provided as in Fig. 4. The entire apparatus just described is mounted on a plate 92 which is shaped to fit the grooves 48 in vertical corner posts 49 interchangeably with the assembly of Fig. 4.

While various changes may be made in the detail construction, it shall be understood that such changes shall be within the spirit and scope of the present invention as defined by the appended claim.

I claim:

In a stereoscopic projection apparatus, a pair of horizontally spaced optical lens holding projection units, a housing, a projection lamp mounted in said housing, a plurality of lenses in said housing arranged in alignment with one another and with said lamp, said housing having side openings opposing one another on the respective opposite sides of the housing between said units and said lenses, a stereoscopic slide carrier extending into said openings, laterally spaced vertically extending posts having guideways in said housing, said housing having a top opening adjacent said posts, a supporting member for said lens holding projection units releasably retained between the guideways of the vertically extending posts, a cover releasably secured to said housing over the top opening and the lens holding projection units, said supporting member having two openings, one of the openings being elongated in a vertical direction and the other opening being elongated in a horizontal direction, means mounting said lens holder projection units for slidable movement in the respective openings of said supporting member, a threaded adjusting element extending through a threaded aperture in the supporting member and engaging a projection unit in said vertically elongated opening to adjust said lens projection unit in a vertical direction, and a second threaded adjusting element extending through a threaded aperture in the supporting member and engaging a lens projection unit in said horizontally elongated opening to adjust said unit in a longitudinal direction.

GUILLERMO CORREA.

References Cited in the file of this patent

UNITED STATES PATENTS

| Number | Name | Date |
|---|---|---|
| 297,851 | Roche | Apr. 29, 1884 |
| 761,977 | Menchen | June 7, 1904 |
| 952,346 | Oldfield et al. | Mar. 15, 1910 |
| 968,667 | Klaiber | Aug. 30, 1910 |
| 1,308,207 | Tolles et al. | July 1, 1919 |
| 1,489,332 | Outrey | Apr. 8, 1924 |
| 1,498,177 | Leonard | June 17, 1924 |
| 1,503,766 | Pictet et al. | Aug. 5, 1924 |
| 1,596,835 | Hewson | Aug. 17, 1926 |
| 1,840,861 | Walker | Jan. 12, 1932 |
| 1,930,421 | Ehmer | Oct. 10, 1933 |
| 2,189,285 | Gruber | Feb. 6, 1940 |
| 2,243,160 | Koehl | May 27, 1941 |
| 2,315,914 | Wengel | Apr. 6, 1943 |
| 2,330,709 | Harper et al. | Sept. 28, 1943 |
| 2,525,598 | Gruber | Oct. 10, 1950 |
| 2,576,714 | Cox | Nov. 27, 1951 |
| 2,598,573 | Lutes | May 27, 1952 |